US007225397B2

(12) United States Patent
Fukuda et al.

(10) Patent No.: US 7,225,397 B2
(45) Date of Patent: May 29, 2007

(54) DISPLAY ANNOTATION AND LAYOUT PROCESSING

(75) Inventors: Kentaroh Fukuda, Sagamihara (JP); Hironobu Takagi, Tokyo-to (JP); Junji Maeda, Tokyo-to (JP); Chieko Asakawa, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 775 days.

(21) Appl. No.: 10/068,425

(22) Filed: Feb. 7, 2002

(65) Prior Publication Data
US 2002/0111966 A1    Aug. 15, 2002

(30) Foreign Application Priority Data
Feb. 9, 2001    (JP)    ............................. 2001-034718

(51) Int. Cl.
*G06N 3/00*    (2006.01)
(52) U.S. Cl. ...................................................... 715/511
(58) Field of Classification Search ................ 715/512, 715/514, 513, 517, 523, 530, 511
See application file for complete search history.

(56) References Cited

U.S. PATENT DOCUMENTS

| 6,484,156 | B1 * | 11/2002 | Gupta et al. .................... 707/1 |
| 6,684,257 | B1 * | 1/2004 | Camut et al. ................ 709/246 |
| 6,877,137 | B1 * | 4/2005 | Rivette et al. .............. 715/512 |
| 2002/0029232 | A1 * | 3/2002 | Bobrow et al. ............. 707/517 |
| 2004/0148571 | A1 * | 7/2004 | Lue ............................. 715/514 |

OTHER PUBLICATIONS

Hori et al. "Annotation-Based Web Content Transcoding," 9th International WWW Conference May 15, 2000, URL, http://www9.org.*
Fukuda et al. "Common Layout Extraction From Web Pages," Research Report of Information Processing Society of Japan, vo. 2001, No. 52, pp. 7-14, May 25, 2001.
Maeda et al. "Visually Enhanced Web Page Presentation Through Page Digesting," Research Report of Information Processing Society of Japan, vol. 2000, No. 12, pp. 19-24, Jan. 28, 2000.
Hori et al. "Annotation-Based Web Content Transcoding," 9th International WWW Conference, May 15, 2000, URL, http:///ww9.org.

\* cited by examiner

*Primary Examiner*—Stephen Hong
*Assistant Examiner*—Kyle R. Stork
(74) *Attorney, Agent, or Firm*—Lisa M. Yamonaco; Anne Vachon Dougherty

(57) ABSTRACT

The present invention provides improvement of operations providing annotation and layout for an HTML page file. In an example embodiment, a page acquisition module obtains page files from a web server, and an HTML file analysis module extracts tags and characteristic values related to the layout. A page group detection module employs layout tags and their characteristic values to group page files that have the same or a similar layout. When an annotation addition module adds an annotation to an arbitrary page file in the obtained layout group, the annotation is applied for another page file in the layout group. When the layout group is divided or layout groups are unified, a correction module for the function of distance calculation corrects a calculation expression for a distance between pages or layout groups in order to reflect the division or unification results obtained by the user.

16 Claims, 10 Drawing Sheets

URL: wwwibm .com/index.html

/html[1]/body[1]/table[1]   width=200bgcolor=blue,...

/html[1]/body[1]/table[1]/tr[1]/td[1] bgcolor=red,..

DISPLAY ANNOTATION AND LAYOUT PROCESSING

FIELD OF THE INVENTION

The present invention relates to an information processing method and an information processing system. More particularly, the present invention relates to improved provision of annotation and/or layout for display.

BACKGROUND

The use of the Internet became popular. As the role of the Internet has been varied, variety of apparatuses for access to the Internet becomes more diverse. Conventionally, a computer system having a CRT (Cathode Ray Tube) with a display area of about 12 to 20 inches, a liquid crystal display or a plasma display device has been used as an apparatus for connection to the Internet.

However, while taking into account cases wherein portability is important, there has been a dramatic spread in the integration of handy telephones, PDAs (Personal Digital Assistants) and i-mode handy phones. These apparatuses are generally having small display area. Further, since visually impaired persons cannot confirm the output of computers by observing display devices, the reading software, such as speech browsers, has been developed. It is anticipated that such reading software will eventually constitute a human interface improvement, not only for visually impaired persons but also for users who are unfamiliar with computers. Then, this kind of software technique can contribute to and promote the wider use of computer systems. In addition, for wearable computers, since the areas of their display devices should perforce be small, it is predicted that speech output will be a primary or, at the least, an auxiliary output means.

In general, the designs of page layouts for web sites are based on the assumption that the display devices of computer systems will have 12 to 20 inch display areas. Furthermore, for the output to display devices, it is premised that displays will be used by persons with normal sight. Specifically, the menu area (link information is embedded there) of a site and an advertisement banner are ordinarily arranged at the upper or left portion of a display area, and the two-dimensional layout of the data is presented, so that it can be easily viewed by users with normal sight. The information inherent to a page commonly tends to be arranged in the center or in the latter half of a page layout.

When a web page, designed for users with normal sight, or a large screen device, is to be displayed on a PDA or a portable telephone, or is to be output by a speech browser, usually the information (frame information, an advertisement, etc.) at the first of a page tends to be an obstacle. The two-dimensional information, such as frame information or advertisements, is effective and improves the usability for users with normal sight and a large screen. However, for users who operate small screen devices or employ speech browsers, these secondary information becomes an obstacle to find the most important information, such as the inherent information of the page. Therefore, when a device having a small screen or a speech browser is employed to output a page file designed for a large screen, we have to provide some method for accessing to important information easily.

Therefore, when a device having a small screen or a speech browser is employed to output a page file designed for a large screen, some means is required for rapidly accessing the initially sought information. One well-known means is a method that provides annotations for a page file.

Annotation is an additional data, such as the structure of a page file and the importance level of each portion. Usually, the annotation is written to an external file, and is used to simplify page file accurately.

However, it is not easy to provide annotations for each page file. Generally, while each page file is browsed and the display-is conformed, the importance level of the page file should be determined and annotations should be provided. These operations need be performed manually. Especially at a news site or a database site, the annotator's workload to prepare annotations is significantly increased because the volume of available page files is large. In addition, when a new file is to be generated by including date data in the URL (Uniform Resource Locator), even if annotations have already been provided to the site, additional annotations should be prepared.

SUMMARY OF THE INVENTION

It is, therefore an aspect of the present invention to provide methods, apparatus and systems for preparing annotations for a page file. Thus, according to the present invention, a example method is provided whereby a page group employing the same layout is detected in accordance with the tag structure of a document, such as an HTML (HyperText Markup Language) document. Then, annotations are shared among these pages. At a site designated by a user, the layout structure of the contents is analyzed, and tags (hereinafter referred to as layout tags) are enumerated that are factors referred to when determining a layout. At the same time, in order to clearly identify the structure of the layout tags in a document, such as an HTML document, the layout tags are written in a structural descriptive form that employs a style for the designation of positions on the page, i.e., an XPath, an XPointer or a tree format. Further, the characteristic values of the layout tags (structural descriptive forms) are acquired. Then, based on the obtained data, the distance between the pages is calculated. Based on the calculated distance, a group of pages using the same layout and a group of pages sharing part of the layout are automatically detected and presented to a user. When the user adds an annotation for one representative page of a page group, a corresponding annotation is added to [generally to all] pages in the group that employ the same layout. When there are pages that share the layout, first, an annotation is added to the portion used in common, and then, annotations are added to the portions that are individually held by individual page groups. In this fashion, an efficient annotation provision can be provided.

Further, in this invention, when a user additionally performs a correction to divide or unify the presented page groups, the results can be employed to correct the distance calculation expression. As a result, the accuracy in the following page group division can be improved.

BRIEF DESCRIPTION OF THE DRAWINGS

These and other aspects, features, and advantages of the present invention will become apparent upon further consideration of the following detailed description of the invention when read in conjunction with the drawing figures, in which:

FIG. 3 is a diagram showing a URL and layout tags, and characteristic values that are related to the URL.

DESCRIPTION OF THE SYMBOLS

Figure 1:
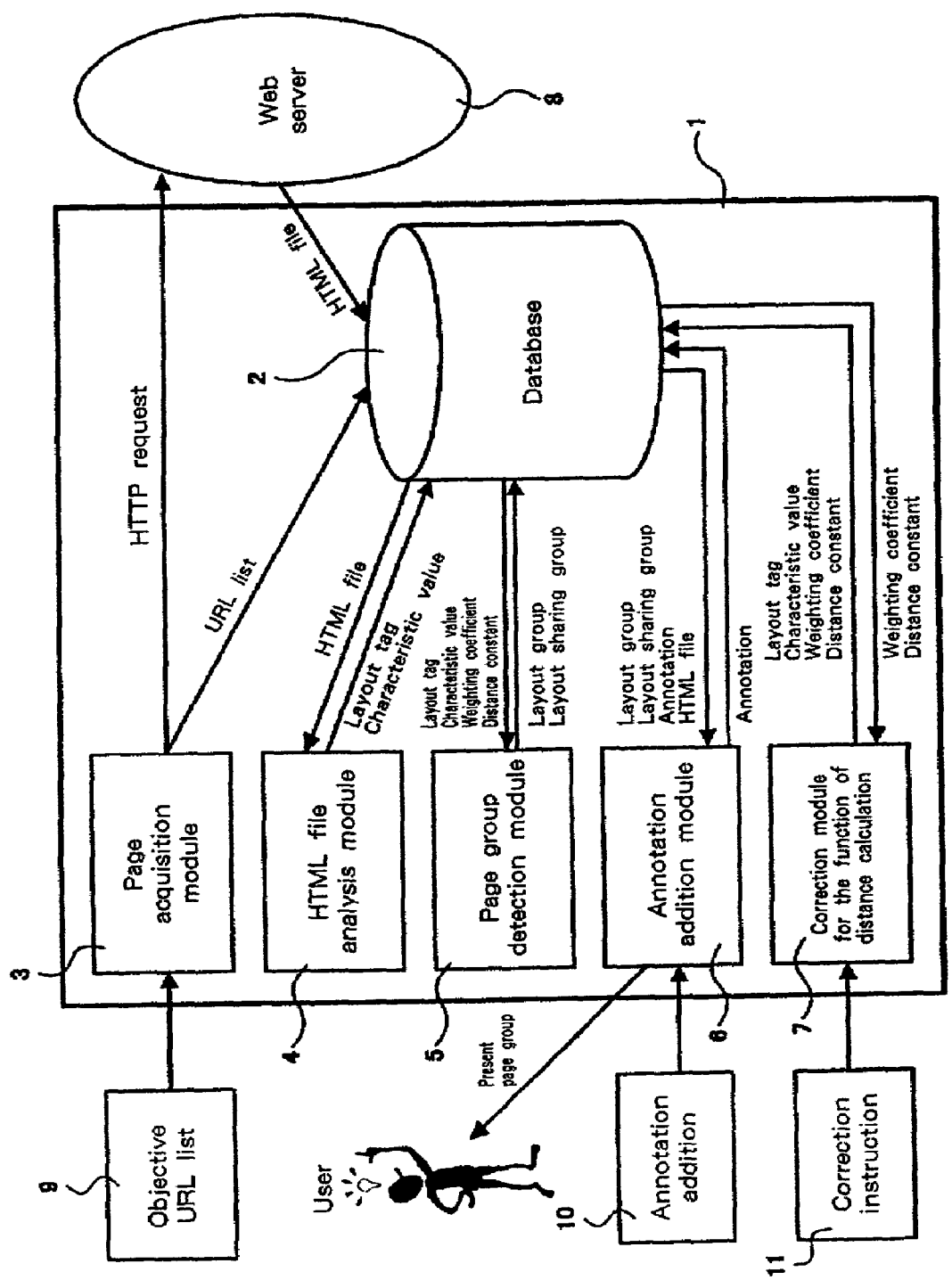
FIG. 1 is a block diagram showing an example information processing system according to one embodiment of the present invention.

1: Information processing system
  2: Database
  3: Page acquisition module
  4: HTML file analysis module
  5: Page group detection module
  6: Annotation addition module
  7: Correction module for the function of distance calculation
  8: Web server
  9: Objective URL list
  10: Annotation addition
  20: HTML parser
  21: Layout tag listing module
  22: Characteristic value acquisition module
  41: Inter-page distance calculation module
  42: Layout group determination module
  43: Representative value calculation module
  44: Inter-layout distance calculation module
  45: Layout sharing group determination module

DESCRIPTION OF THE INVENTION

The present invention provides methods, apparatus and systems whereby a page group employing the same layout is detected in accordance with the tag structure of a document, such as an HTML document. Then, annotations are shared among these pages. At a site designated by a user, the layout structure of the contents is analyzed, and tags are enumerated that are factors referred to when determining a layout. At the same time, in order to clearly identify the structure of the layout tags in a document, such as an HTML document, the layout tags are written in a structural descriptive form that employs a style for the designation of positions on the page, i.e., an XPath, an XPointer or a tree format. Further, the characteristic values of the layout tags (structural descriptive forms) are acquired. Then, based on the obtained data, the distance between the pages is calculated. Based on the calculated distance, a group of pages using the same layout and a group of pages sharing part of the layout are automatically detected and presented to a user. When the user adds an annotation for one representative page of a page group, a corresponding annotation is added to [generally to all] pages in the group that employ the same layout. When there are pages that share the layout, first, an annotation is added to the portion used in common, and then, annotations are added to the portions that are individually held by individual page groups. In this fashion, an efficient annotation provision can be provided.

Further, in this invention, when a user additionally performs a correction to divide or unify the presented page groups, the results can be employed to correct the distance calculation expression. As a result, the accuracy in the following page group division can be improved.

An example embodiment of the present invention will now be described in detail while referring to the accompanying drawings. It should be noted, however, that the present invention can be implemented by various other embodiments, and is not limited to this embodiment. Further, throughout this embodiment, the same reference numerals are used to denote corresponding or identical components.

In the embodiment, mainly, a method or a system will be explained. However, as will be apparent to one having ordinary skill in the art, the present invention can be implemented not only as a method and a system, but also as a computer-readable program, or as a storage medium on which such a program is stored. Therefore, the present invention can be provided as hardware, software or a combination of hardware and software. An example storage medium on which the program can be recorded is an arbitrary computer-readable storage medium, such as a hard disk, a CD-ROM, an optical storage device or a magnetic storage device.

In the following embodiment, a common computer system can be employed. The computer system used for this embodiment comprises a central processing unit (CPU), a main memory (RAM) and a nonvolatile memory (ROM), [generally to all] of which are interconnected by a bus. In addition, a co-processor, an image accelerator, a cache memory and an input/output controller (I/O) may be connected to the bus. Further, an external storage device, a data input device, a display device and a communication controller are also connected to the bus via an appropriate interface, as are the hardware resources generally provided for a computer system. An example external storage device is a hard disk drive; however, a device such as a magneto-optical storage device, an optical storage device or a semiconductor storage device, such as a flash memory, can also be employed as an external storage device. As the data input device, a device such as a keyboard, a pointing device, such as a mouse, a pen input device or a tablet can be employed. The data input device also includes an image reader, such as a scanner, or a speech input device. An example display device can be a CRT, a liquid crystal display device or a plasma display device. Furthermore, the computer system includes an arbitrary computer, such as a personal computer, a workstation or main frame computer.

FIG. 1 is a block diagram showing an example information processing system according to one embodiment of the present invention. An information processing system 1 of this embodiment comprises a database 2, a page acquisition module 3, an HTML file analysis module 4, a page group detection module 5, an annotation addition module 6 and a correction module 7 for the function of distance calculation.

The database 2 is used to record data generated by modules that will be described later and a page file (also called an HTML file) obtained from a web server 8. The database 2 is constituted by a storage device, such as a hard disk drive, that is internally provided for the information processing system 1 of this embodiment and software for controlling the input/output of data. However, the database 2 is not necessarily provided inside the information processing system 1, and may be an external file as designated by a URL. Further, the database 2 need not be intensively managed, and may be recorded and managed in a distributed manner. That is, so long as the input/output of necessary data can be carried out by appropriate address designation means, the database 2 of this embodiment can be constituted, regardless of the type of physical storage device or its location.

The page acquisition module 3 receives an objective URL list 9 from a user, and obtains the contents of the associated URL from the web server 8. For example, HTTP (HyperText Transfer Protocol) is used for an acquisition request, and the obtained HTML file (page file) will be recorded in the database 2.

First, the page acquisition module 3 obtains the page file of the objective URL list 9. Then, the URLs (e.g., obtained from the href attribute of <a> tag) included in a page at the objective URL are enumerated, and from among these URLs, only a URL included in a range designated by a user is selected and is added to the URL list 9. Following this, the pages on the URL list 9 are sequentially obtained, and as the page files are obtained, they are recorded in the database 2. When URLs that are related to the associated URL that is obtained are included, the same process is recurrently performed for these associated URLs. In this manner, pages linked in the site can be obtained. Meanwhile, a double registration should not be performed for a URL that has already appeared on the URL list 9. The URL list 9 is also recorded in the database 2.

The HTML file analysis module 4 analyzes the page files obtained by the page acquisition module 3 in order to list the layout tags that affect the page layout and to obtain the characteristic values of the layout tags.

Figure 2:
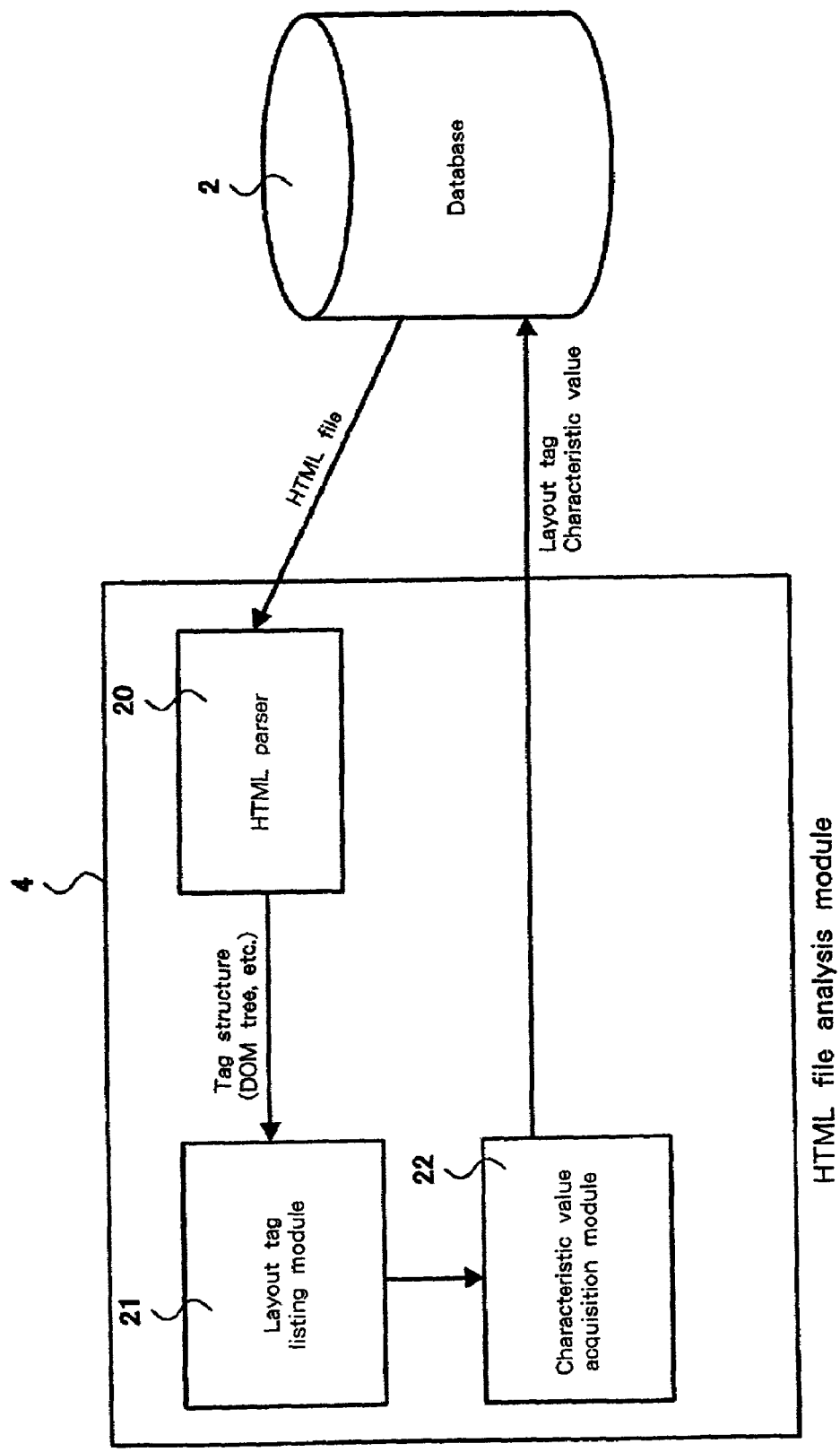
FIG. 2 is a block diagram showing an example structure of an HTML file analysis module.

FIG. 2 is a block diagram showing an example configuration for the HTML file analysis module 4. The HTML file analysis module 4 includes an HTML parser 20, a layout tag listing module 21 and a characteristic value acquisition module 22.

The HTML parser 20 analyzes the HTML file obtained by the page acquisition module 3, and converts the HTML file into a tag structure description form, such as a DOM tree.

The layout tag listing module 21 employs the structural descriptive form to list, from the obtained tag structure, the tags (layout tags) that affect the layout structure. Example layout tags can be "table", "tbody", "tr", "td", "th" and "hr". The style, such as the XPath or XPointer, for designating the position on a page, or the tree format can be employed as the structural descriptive form.

The characteristic value acquisition module 22 correlates, with the structure description form, the characteristic values of the attributes of the listed layout tags and elements that are included in the sub-trees of the layout tags. The following attributes and elements can be employed as the characteristic values. For layout tag "table", there are the attributes "align", "bgcolor", "border", "cellpadding", "cellspacing" and "width". For layout tag "tbody", there are the attributes "align" and "valign". For layout tag "tr", there are the attributes "align", "bgcolor" and "valign". For layout tag "td" or "th", there are the attributes "align", "bgcolor", "colspan", "height", "rowspan", "valign" and "width" and the presence/absence of the element, such as text or an image, and the size of the element. And for layout tag "hr", there are the attributes "align", "width", "size" and "noshade".

The HTML file analysis module 4 correlates the layout tags having the structural descriptive form and the correlated characteristic values with the URLs of the URL list. The HTML file analysis module 4 then records the layout tags and the characteristic values in the database 2.

FIG. 3 is a diagram showing a URL on the URL list and the layout tags and the characteristic values that are correlated with the URL. For example, URL "http://www.ibm.com/index.html"

includes layout tags

"/html[1]/body[1]/table[1]", and

"/html[1]/body[1]/table[1]/tr[1]/td[1]", which are written in the structure description form (XPath in this case). Characteristic values "width=200, bgcolor= blue, . . . " are correlated with "/html[1]/body[1]/table[1]", while characteristic value "bgcolor=red, . . . " is correlated with "/html[1]/body[1]/table[1]/tr[1]/td[1]".

The page group detection module 5 calculates an inter-page distance by using the layout tags and the characteristic values that are obtained by the HTML file analysis module 4. With this function, the page group detection module 5 extracts, as a layout group, a group of pages having the same or similar layout structure. In addition, the page group detection module 5 calculates, for one part of the area of the page file, a layout having a layout structure used in common by another page file, and extracts these page files as a layout sharing group.

Figure 4:
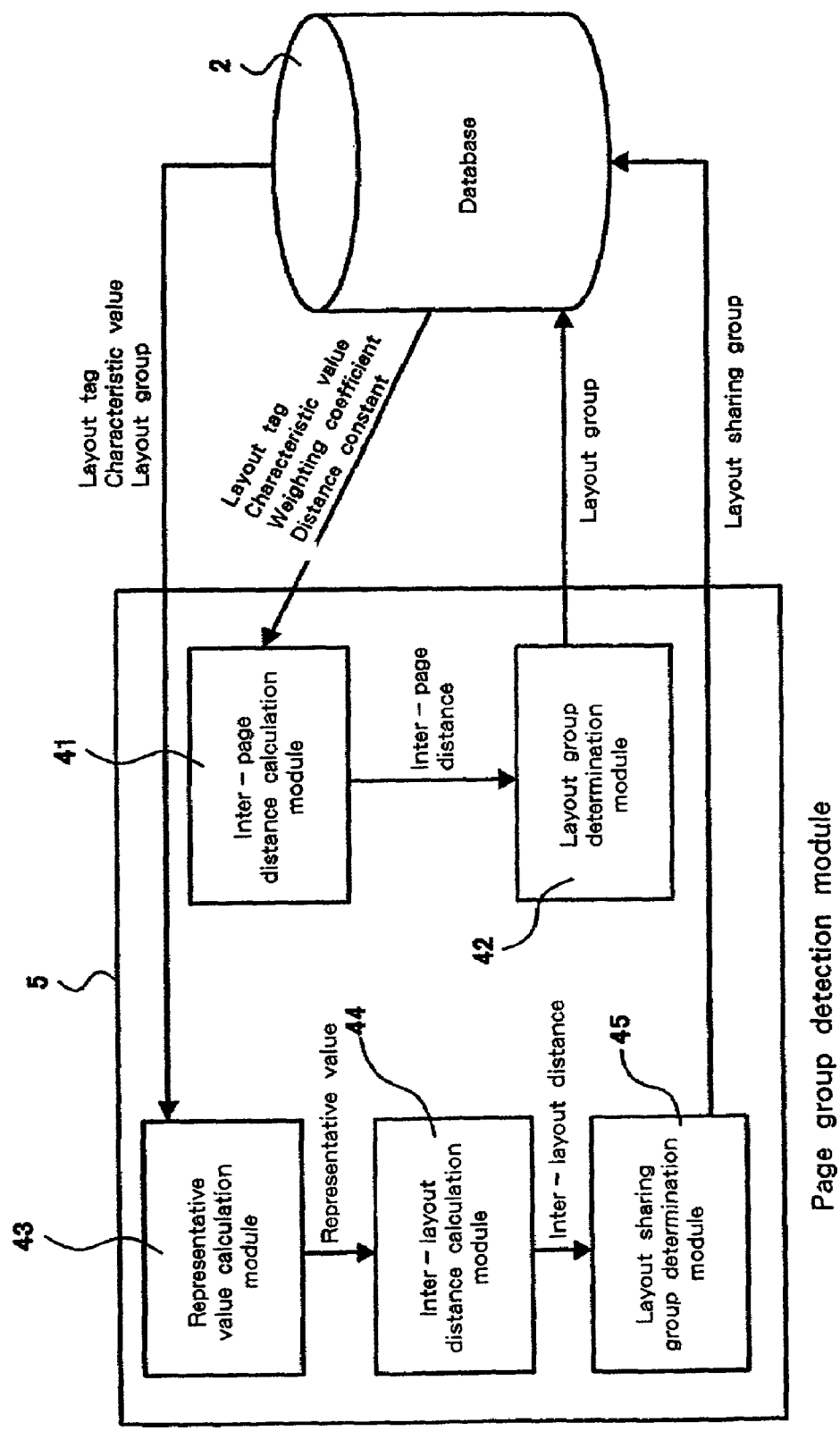
FIG. 4 is a block diagram showing an example structure for a page group detection module.

FIG. 4 is a block diagram showing an example structure for the page group detection module 5. The page group detection module 5 includes an inter-page distance calculation module 41, a layout group determination module 42, a representative value of layout group calculation module 43, an inter-layout distance calculation module 44, and a layout sharing group determination module 45.

The inter-page distance calculation module 41 employs a characteristic value correlated with the layout tag to calculate a distance between a page file including the layout tag and another page file. The layout group determination module 42 extracts, as a layout group, page files for which the inter-page distance calculated by the inter-page distance calculation module 41 falls within a predetermined range. The representative value calculation module 43 calculates a representative value for page file groups that are layout groups and have the same or similar layout structure. The inter-layout distance calculation module 44 calculates the distance between layout groups. The layout sharing group determination module 45 determines whether part of page files in a layout group includes the same or similar layout structure used in common by page files in other layout groups. When there is a layout used in common, the page files in the layout groups are extracted as layout sharing groups.

There are several methods that can be used for calculating the distance between pages. For this embodiment, an explanation will now be given for a method whereby the layout tags and their characteristic values are weighted, and the total of the distances between these tags is defined as an inter-page distance. Assuming that A and B denote sets of structural descriptive forms for layout tags included on two target pages for distance calculation, the inter-page distance D is represented by the following equation.

$$D = \Sigma d_i(T_i)$$

where $T_i$ denotes the i-th element of the layout tag that satisfies $A \cup B$, and $d_i$ denotes the distance function of layout tag $T_i$. It should be noted that i satisfies $1 \leq i \leq$ (the total number of layout tags that satisfy $A \cup B$).

The distance function $d_i$ is a function of the layout tag $T_i$, and when $T_i \in (A \cap B)$, $$d_i(T_i) = W_i * \Sigma W_{cij} * (f_i(C_{Aij}, C_{Bij}))$$

while in other cases, $$d_i(T_i) = W_i * L_i,$$

where $W_i$ denotes a weighting coefficient for the layout tag $T_i$, and "1", for example, can be employed. $C_{ij}$ denotes the value of a characteristic value j for the layout tag $T_i$. $W_{Cij}$ denotes the weighting coefficient for the characteristic value $C_{ij}$ of the layout tag $T_i$, and "1", for example. $f_i$ denotes a function that represents the distance between the characteristic values, while a function for returning a "0" when the characteristic values are the same and for returning a "1" when they differ can be employed. $L_i$ denotes a distance constant when the layout tag $T_i$ is present only on one page, and, for example, $L_i$=5 can be employed.

The inter-page distance calculation module 41 calculates the inter-page distance D using the above method, and the layout group determination module 42 employs the inter-page distance D to group the same or similar layouts. A method, such as clustering, can be employed for this determination means, and the inter-layout distance D of equal to or smaller than threshold value e.g. 10 can be employed as the reference for determination of the similarity range.

Figure 5:
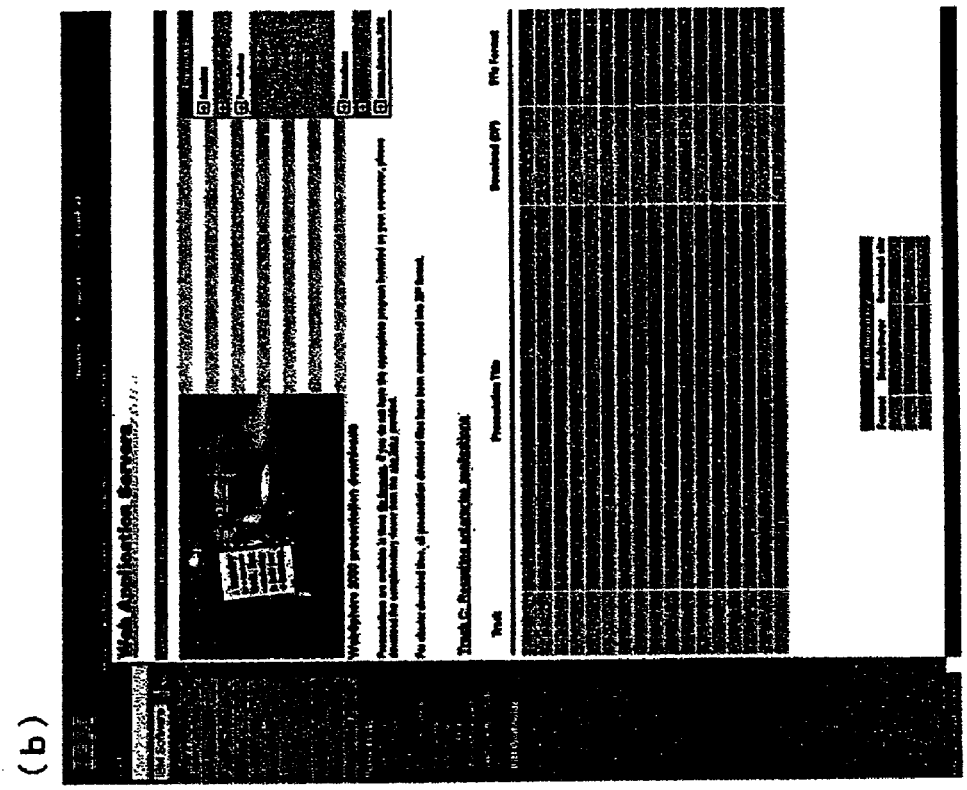
FIG. 5 is a diagram showing a screen obtained by browsing example page files that fall into the same layout group.
Figure 5:
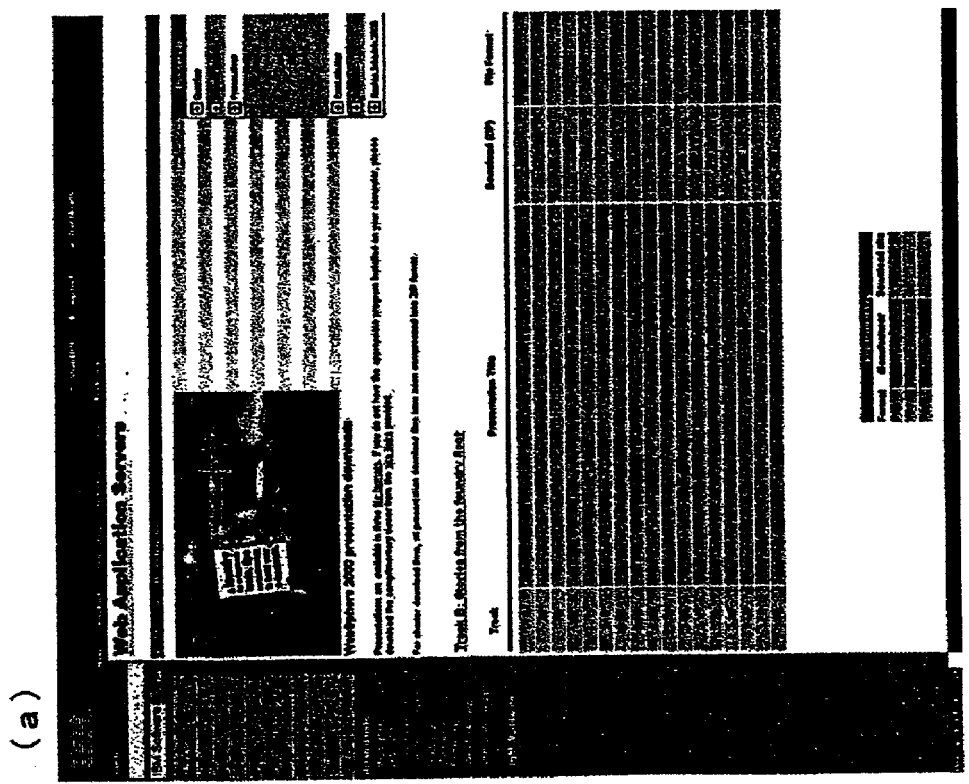

An example page file that constitutes the thus generated layout group is shown in FIGS. 5A and 5B. FIG. 5A is a diagram showing a screen presented by browsing a specific page file, and FIG. 5B is a diagram showing a screen presented by browsing a second page file. The distance between these pages obtained by the above method is "0" in this case. That is, in the structure of the page layout, the layout tags and characteristic values are the same for the file in FIG. 5A and the file in FIG. 5B. Thus, these two page files fall into the same layout group. Naturally, however, contents irrelevant to the layout structure (the contents of individual table elements) differ.

Figure 6:
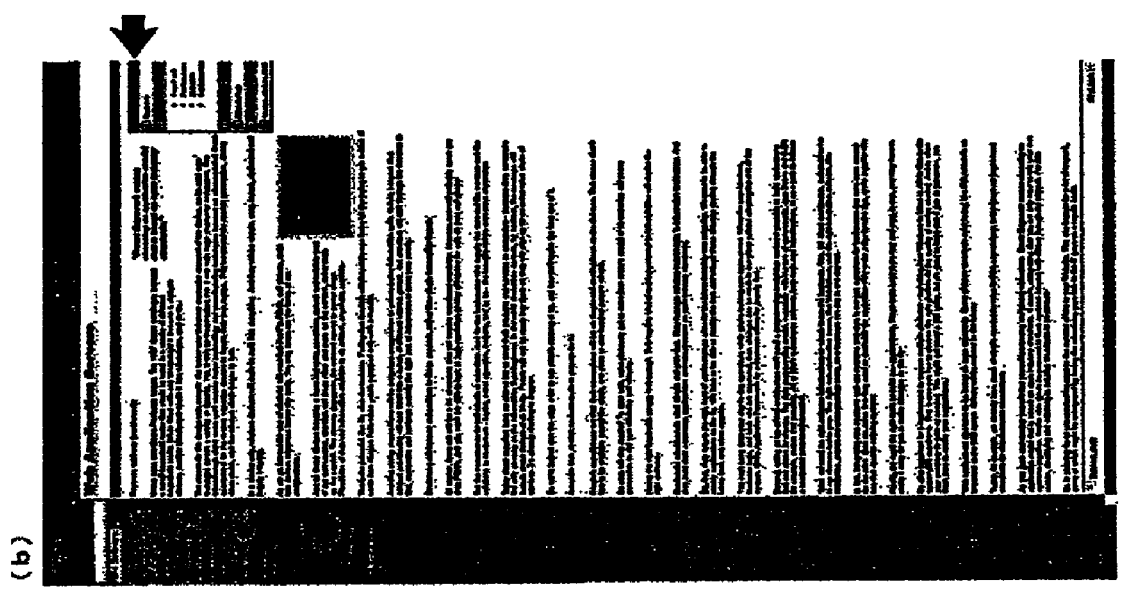
FIG. 6 is a diagram showing a screen obtained by browsing another example page file that falls in the same layout group.
Figure 6:
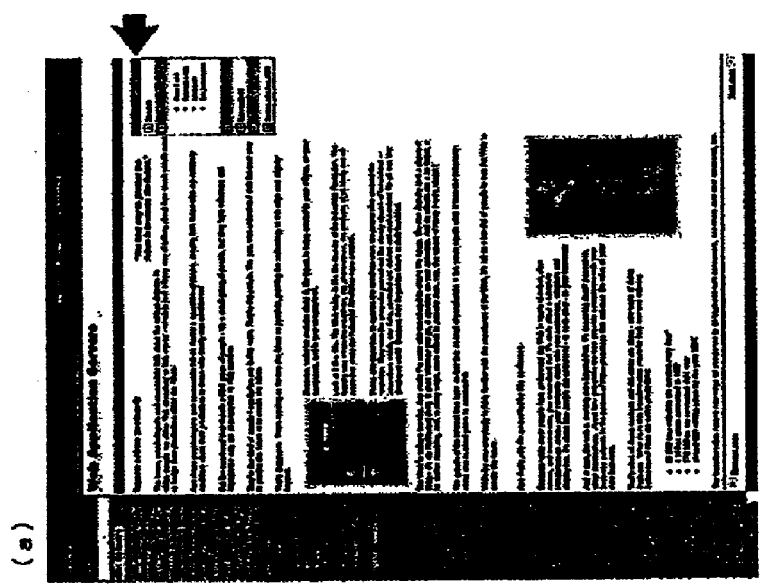

Another example of page files in the same layout group is shown in FIGS. 6A and 6B. FIG. 6A is a diagram showing the screen obtained by browsing a specific page file, and FIG. 6B is a diagram showing the screen obtained by browsing a second page file. The inter-page distance obtained by the above method is "3" in this case, and both of the page files have the same layout tag structure. However, the layout tags related to the layouts for portions indicated by arrows have different characteristic values (display colors in this example). In this example, an inter-page distance of "3" is obtained because of this difference. However, since the inter-page distance does not exceed "10", it is ascertained that the page files are similar and fall into the same layout group.

Figure 7:
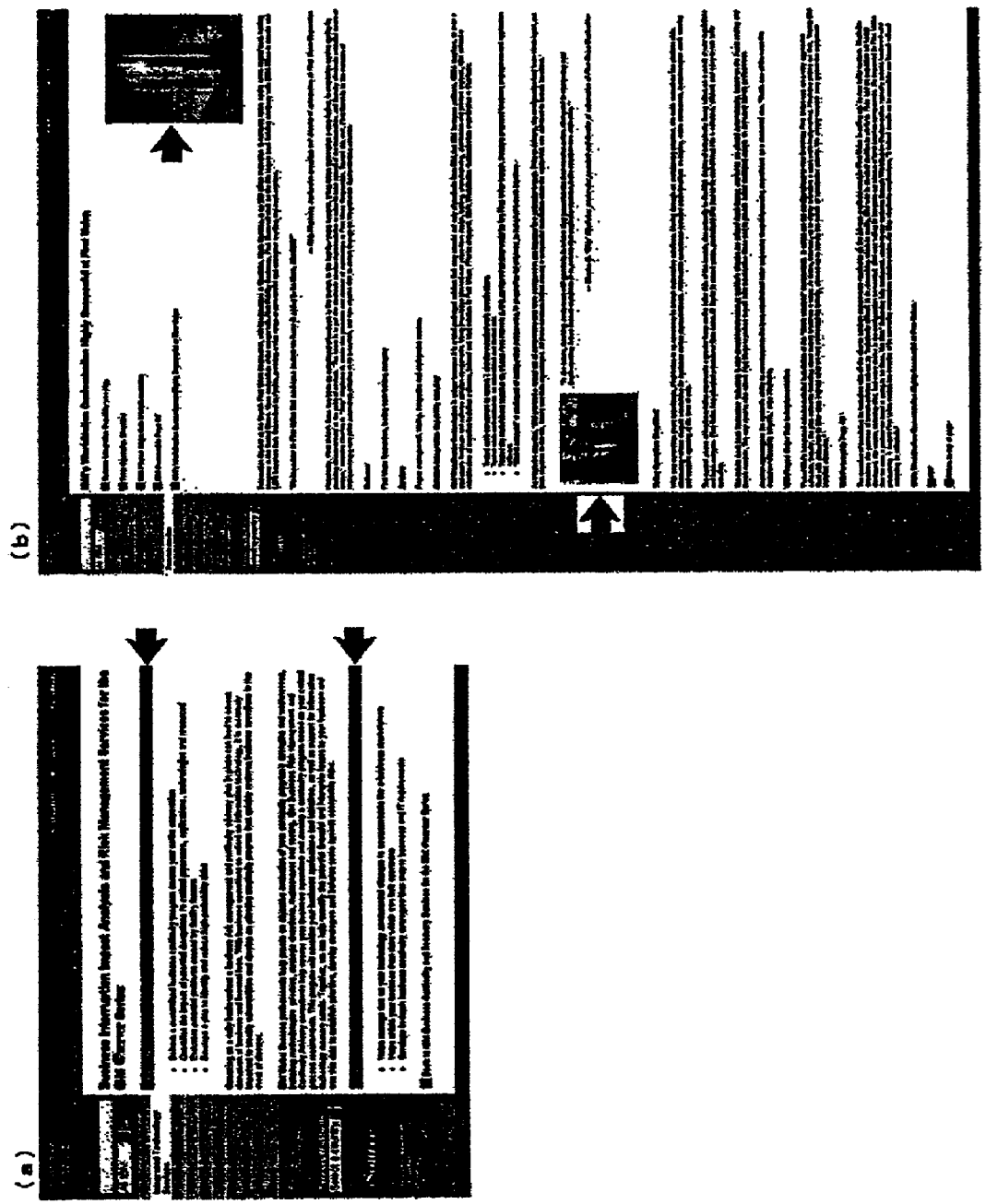
FIG. 7 is a diagram showing a screen obtained by browsing example page files that do not fall into the same layout group.

FIGS. 7A and 7B are diagrams showing examples of screens of page files that do not fall into the same layout group. The page files in FIGS. 7A and 7B are displayed by browsing, as are those in FIGS. 5 and 6. In this case, the layout tag structures are the same. However, the characteristic values of the layout tags of the two page files differ greatly, and it is ascertained that the page files have different layouts. For example, for layout tag "td" at the portions indicated by arrows, in FIG. 7A characters are arranged by setting "width", while in FIG. 7B an image is simply located. Further, in FIG. 7A "bgcolor" is set for the layout tag "tr", while in FIG. 7B "bgcolor" is not set. Because of these differences, an inter-page distance D of "14" is obtained, and the page files fall into different layout groups.

Through this processing, the grouping of same or similar page files is accomplished and the obtained layout groups are recorded in the database 2.

An explanation will now be given for the processing for extracting a layout sharing group having the same layout of one part of a page file. For each layout group obtained by the above method, the representative value calculation module 43 calculates the representative values of the layout group based on the layout tags and the characteristic values. First, the representative value calculation module 43 obtains a layout tag that is representative of the layout group. The method for obtaining a representative tag can be a method for calculating a set of sums or a set of products of the layout tags included in the page files of the layout group. As other methods, there are a method can be a method for obtaining a set of layout tags such that the number of page files having a specific layout tag exceeds a threshold value, and an arbitrary method for determining a tag representative of the layout tags for the layout group. Subsequently, the representative value calculation module 43 determines the characteristic values of the selected layout tags. A method for determining the characteristic values can be one whereby a decision is obtained based on a majority or an average of the characteristic values of the page files in the layout group.

The inter-layout distance calculation module 44 calculates the distance between the layout groups by using the representative values for the individual layout groups obtained by the representative value calculation module 43.

Several methods are available for calculating the distance between layout groups. In this embodiment, an explanation will be given for a method for performing weighting for a layout tag and its characteristic value, and for obtaining, as an inter-layout distance, the sum of distances between tags. When A' and B' denote sets of representative tags belonging to two layout groups between which the distance is to be calculated, the inter-layout distance D' is represented by the following equation, $$D' = \Sigma d_i'(T_i)$$

where $T_i$ denotes the i-th element of layout tags that satisfy A'∪B', and $d_i$ denotes the distance function for the layout tag $T_i$. It should be noted that i is $1 \leq i \leq$ (the total of the layout tags that satisfy A'∪B').

The distance function $d_i'$ is the function of the layout tag $T_i$, and when $T_i \in (A' \cap B')$, $$d_i'(T_i) = W_i'*(M_i + \Sigma W_{cij}'*(f_i'(C_{Aij}, C_{Bij}))),$$

is established, whereas in another case, $$d_i'(T_i) = W_i' * L_i'.$$

$W_i'$ denotes the weighting coefficient of the layout tag $T_i$, and is, for example, "1". $C_{ij}'$ denotes the characteristic value j of the layout tag $T_i$. $W_{Cij}'$ denotes the weighting coefficient of the characteristic value $C_{ij}$ of the layout tag $T_i$, and is, for example, "1". $f_i'$ denotes a function that represents the distance between characteristic values. For $f_i'$, a function can be employed that returns a "0" when the characteristic values are the same or that returns a "1" when the characteristic values differ. $M_i$ denotes the distance constant when the layout tag $T_i$ is present in both of the layout groups. $L_i'$ denotes the distance constant when the layout tag $T_i$ is present in only one. In this manner, the distance D', which separates the layout groups, can be obtained.

The layout sharing group determination module 45 employs the inter-layout distance D', which is supplied by the inter-layout distance calculation module 44, to group page files using a method such as clustering. Then, those page groups (layout sharing groups) that are assumed to share a part of the layout are enumerated. It should be noted that inherent layout IDs are allocated for the layout groups or the layout sharing groups.

In response to an annotation addition request 10 issued by a user, the annotation addition module 6 adds an annotation to each group. To add an annotation to an entire layout group, the annotation addition module 6 correlates the annotation with an inherent layout ID allocated for the layout group.

For the addition of the annotation, a page group (a layout group or a layout sharing group) detected by the page group detection module 5 is presented to the user. At this time, the relationship of the sharing of the layout is depicted using a graphical method, e.g. tree graph, it can be easily understood by the user.

Sequentially, the user selects a page from the presented page group, and adds the annotation to the selected page. Then, the annotation is stored in the database 2, correlated with the layout ID of the pertinent page. When a layout sharing group is present, the annotation added to the tag structure that is stored in common (hereinafter referred to as a sharing layout) is copied to and stored in correlation with the layout ID of each element of the layout sharing group.

When the user selects a page for which the annotation has already been added to the sharing layout portion, the sharing layout portion is highlighted and presented to the user, so that the annotation information can be referred to. Therefore, the user need only add the annotation to the portion that the layout group independently stores, and can add the annotation for the entire page.

When the user divides or unifies layout groups or separates members of a sharing relationship, the correction module 7 for the function of distance calculation corrects the parameters used for distance calculation, so that they reflect the division or unification or the separation.

When the user corrects the presented page group, for example, by dividing or unifying it, the inter-page distance calculation expression is corrected using the correction results, and the accuracy of the division of a page group can thereafter be increased. To make the correction, various methods can be employed. For this embodiment, an explanation that will now be given describes a method used to change the inter-page distance calculation expression by changing the weighting provided for the layout tag and the characteristic value.

When the division of a layout group is instructed, in the groups obtained by the division, different layout tags and characteristic values are employed. The inter-page distance calculation expression is changed by increasing the weighting for layout tags and for characteristic values, and during the following page group detection process, these layout groups are detected as different groups. It should be noted that the weighting may be reduced for layout tags, which are matched for the groups obtained by the division, and for characteristic values.

When the merging (unification) of layout groups is instructed, contrary to what is described above, the weighting for the layout tags and the characteristic values is reduced. And the calculation expression is changed, so that during the following page group detection process and the layout sharing determination process, these layout groups are determined to be members of the same page group or layout sharing group. It should be noted that in a merged group the weighting of layout tags and characteristic values that match may be increased.

When the user adds a correction, such as the cancellation (separation) of a layout sharing relationship, similarly, the layout tags and characteristic values that differ between the representative values for the layout groups are employed. The inter-layout distance calculation expression is corrected by changing the weighting provided for these layout tags and characteristic values. As a result, the accuracy attained in the determination of the layout sharing can thereafter be increased.

An overview of the information processing system of this embodiment has been given. Now, an explanation will be presented for an annotation addition method that uses this system. First, a user designates the URL of an object site and the condition (the directory or the updating date) of an object to which an annotation is to be added. Then, during the processing performed by the information processing system, the page acquisition module 3 obtains an object HTML file, the HTML file analysis module 4 analyzes the page file, and the page group detection module 5 detects a layout group and a layout sharing group.

Following this, the page groups (layout groups) that are assumed to have the same layout are presented to the user in an arbitrary order, such as the descending order of the number of page files in the page group. Then, a request is issued for the addition of an annotation to an arbitrary page (page file) in the page group.

Figure 8:
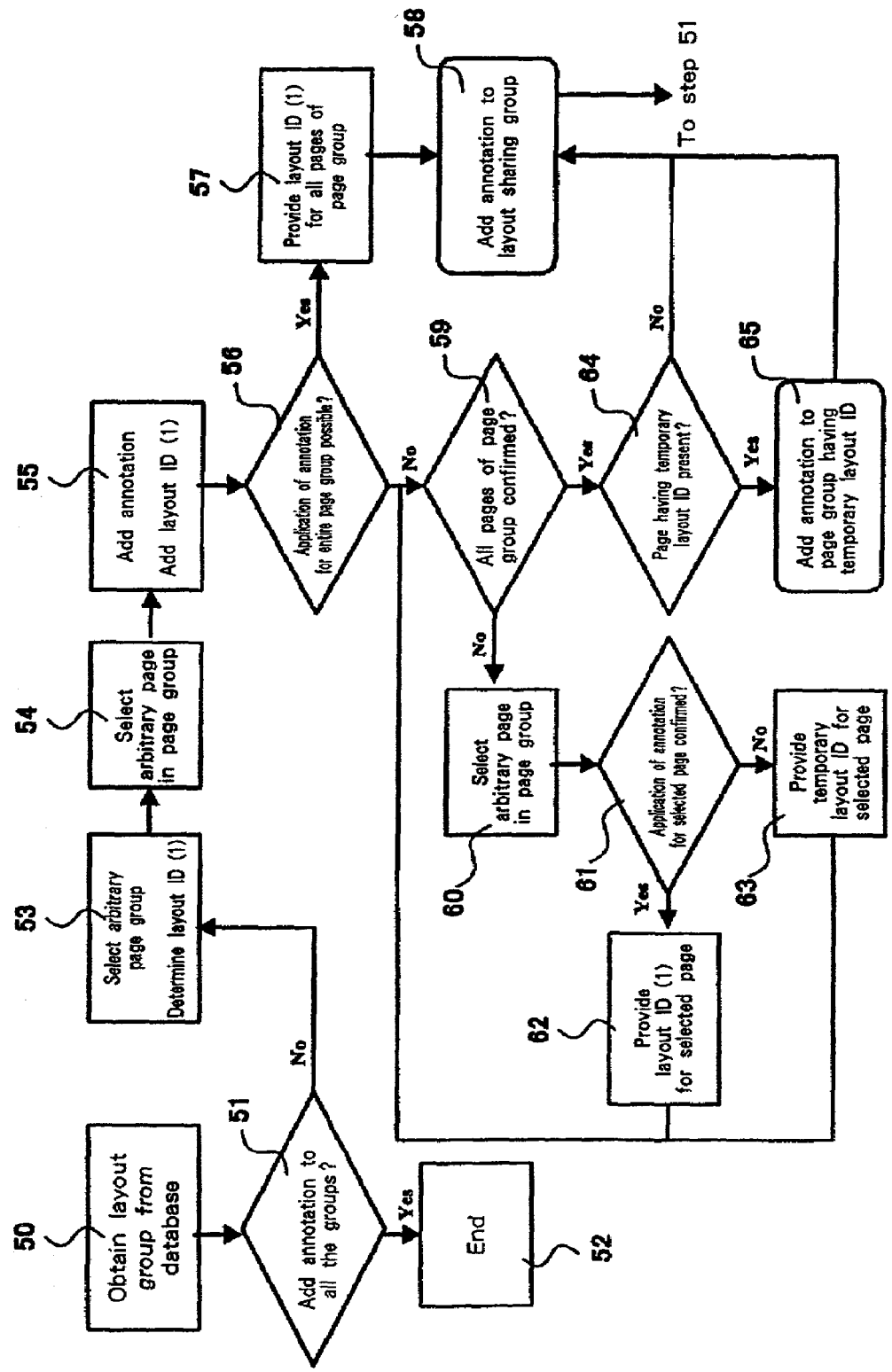
FIG. 8 is a flowchart showing the annotation addition processing.

FIG. 8 is a flowchart showing the annotation addition processing. First, as is described above, layout groups (page groups) are obtained from the database 2 and are presented to the user (step 50). Then, a check is performed to determine whether an annotation has been added to [generally to all] the layout groups (step 51). When an annotation has been added to the layout groups, the processing is terminated (step 52). But when an annotation has not yet been added to one or more layout groups, program control shifted to step 53. At step 53, an arbitrary layout group (page group) is selected, and a layout ID(1) is selected for correlation with the page group.

Then, an arbitrary page (page file) in the page group (layout group) is selected by the user (step 54). Thereafter, at step 55, the selected page file is presented to the user by an appropriate browser, and the user, while watching the display screen, adds an annotation. Specifically, the user adds, for example, a link for jumping to a screen division for a PDA or a small screen device, or to the content of a speech browser. The layout ID(1) is then correlated with the added annotation.

After the annotation has been provided, the number of applicable pages in the page group is presented to permit the user to select either to present the annotation provided for the entire page group, or to apply the annotation for the individual pages. That is, a check is performed to decide whether it is possible to use the annotation for the entire page group (layout group) (step 56). When the decision at step 56 is 'Yes', the layout ID(1) is provided for [generally to all] the page files in the page group (step 57), and program control advances to step 58 for the provision of an annotation for the layout sharing group.

When the decision at step 56 is 'No', a check is performed to determine whether it is possible to add the annotation to selected pages of the page group. At step 59 a check is performed to confirm that [generally all] pages in the page group have been processed. When the decision is 'No', one of the remaining pages is selected (step 60).

A check is then performed to determine whether it is possible to use the annotation for the selected page (step 61). When it is determined the use of the annotation is possible (the decision at step 61 is 'Yes'), the layout ID(1) is provided for the selected page (step 62). When it is determined use of the annotation is not possible (the decision at step 61 is 'No'), a temporary layout ID is provided for the selected page (step 63). This temporary layout ID is a common ID provided for pages for which the layout ID(1) can not be used, and an identification ID for the performance of the individual processes, as will be described later.

After the layout ID(1) or the temporary layout ID has been provided, program control returns to step 59, and the processing at step 59 and the following steps is repeated. When it is ascertained at step 59 that [generally to all] the pages in the page group have been processed, a check is performed to determine whether a page is present for which the temporary layout ID was provided (step 64). When the decision is 'Yes', program control advances to a process (step 65) for adding an annotation to a page group for which a temporary layout ID was provided. When no pages remain for which the temporary layout ID was provided, program control advances to step 58.

Figure 9:
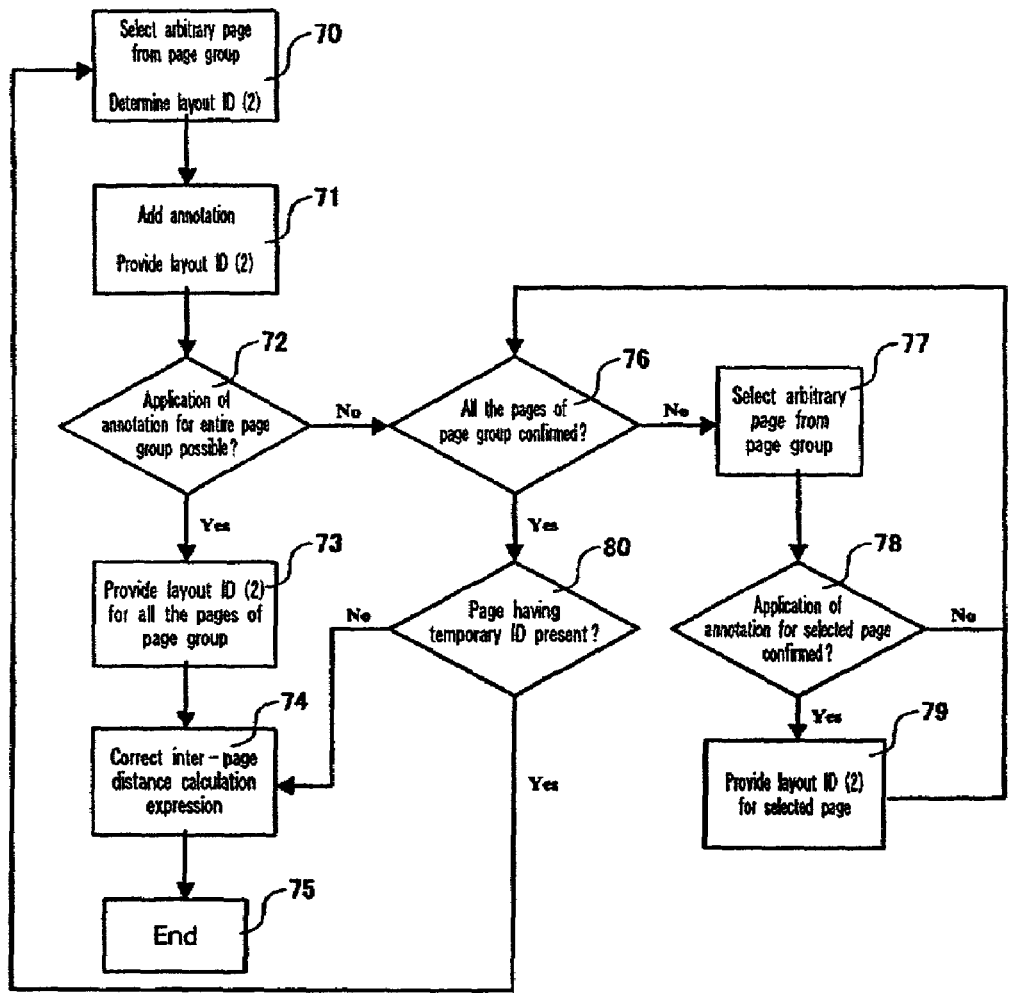
FIG. 9 is a flowchart showing the processing for adding an annotation to a page group for which a temporary layout ID was provided.

FIG. 9 is a flowchart showing the processing for adding an annotation to a page group for which the temporary layout ID has been provided. When program control advances to step 65 in the flowchart in FIG. 8, the processing in FIG. 9 is performed. First, an arbitrary page is selected from the page group including pages for which the temporary layout ID was provided (step 70), and a layout ID(2) is provided for the selected page. Then, an annotation is added to the selected page (step 71). The layout ID(2) is provided for the annotation. A check is then performed to determine whether the annotation can be added to [generally to all] the pages in the page group that were provided the temporary layout ID (step 72). When the decision is 'Yes', the layout ID(2) is added to [generally to all] the pages of the page group that were originally provided the temporary layout ID (step 73). The inter-page distance calculation expression is then corrected (step 74), and thereafter the processing is terminated (step 75).

When the decision at step 72 is 'No' (when the annotation can not be used for all the pages in the page group that were provided the temporary layout ID), a check should be performed to determine whether the annotation can be applied for individual pages. At step 76, a check is performed to determine whether it is confirmed that the annotation can be added to [generally to all] the pages in the page group for which the temporary layout ID was provided. When the confirmation is not yet completed (the decision is 'No'), an arbitrary page is selected from the page group (step 77), and a check is performed to determine whether the application of the annotation for the selected page is possible (step 78). When the application is possible, the layout ID(2) is provided for the selected page (step 79) and program control returns to step 76. When, at step 78, the annotation can not be applied, program control returns to step 76 without performing any further processes (maintains the temporary layout ID).

When the decision at step 76 is 'Yes' (the confirmation for the pages has been completed), a check is performed to determine whether there is a page for which the temporary layout ID was provided (step 80). When there is no page for which the temporary layout ID was provided (the decision is 'No'), program control is shifted to step 74, and the inter-page distance calculation expression is corrected. The processing is thereafter terminated (step 75). But when there is a page for which the temporary layout ID is provided (the decision at step 80 is 'Yes'), program control returns to step 70 and the above processing is repeated.

Through this processing, [generally all] pages having the temporary layout ID are processed and an appropriate annotation is assigned to each of the pages of the target page group (layout group). When different annotations are provided for pages in the same layout group, at step 74 the inter-page distance calculation expression is corrected. Thus, through the calculation of the next inter-page distance, the correction is reflected and the pertinent pages are sorted into different layout groups.

Figure 10:
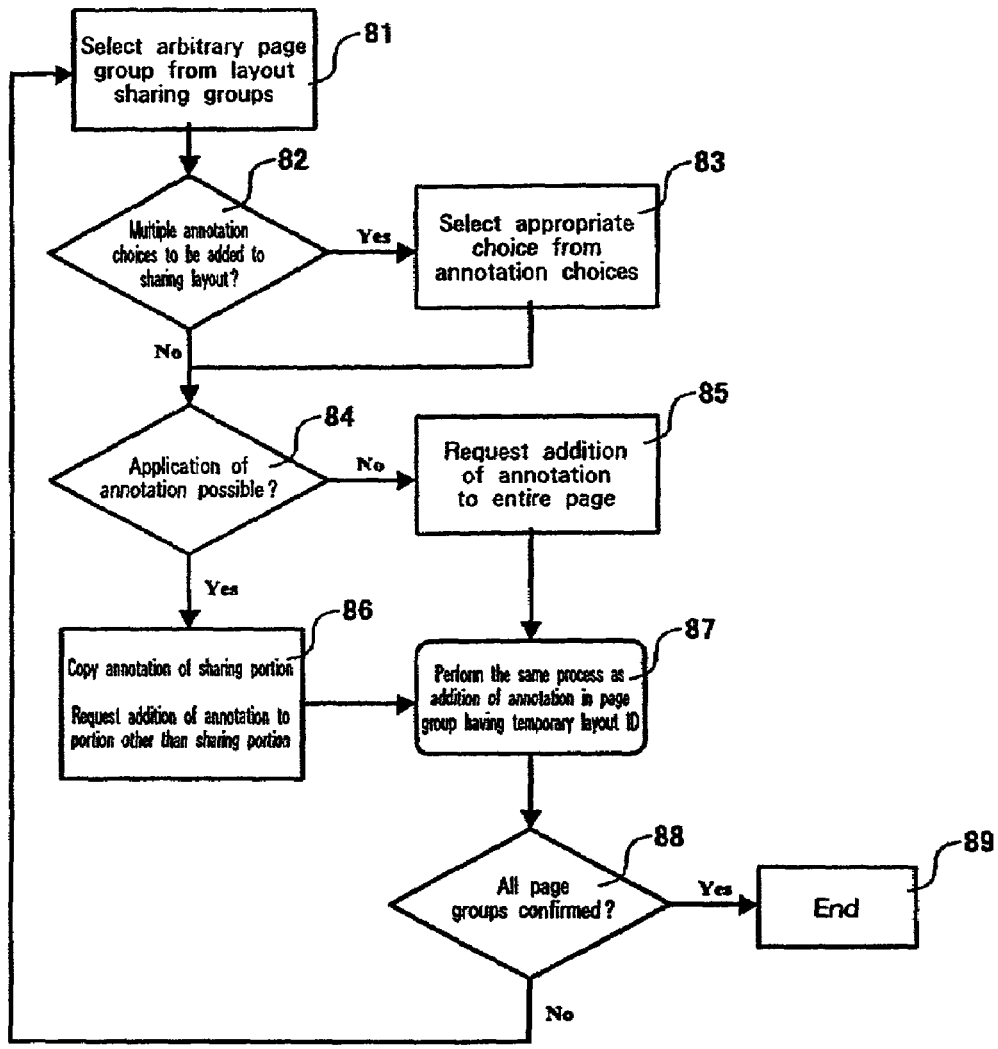
FIG. 10 is a flowchart showing the processing for adding an annotation to a layout sharing group.

The processing for adding an annotation to the layout sharing group (step 58) will now be described. FIG. 10 is a flowchart showing the processing for adding an annotation to the layout sharing group. First, an arbitrary page group (layout group) is selected from among the layout sharing groups (step 81). Then, a check is performed to determine whether there are multiple annotation choices to be added to the sharing layout (step 82). Since a page group is divided or different annotations are provided in the layout sharing group, it is highly probable that multiple annotation choices will be available for the layout sharing portion. In this case, in the following process for adding an annotation to a layout sharing group, annotation choices are presented in order to permit a user to select one of them (step 83). Then, a check is performed to determine whether the selected annotation can be applied for the layout sharing portion (step 84). When the application is possible, the annotation to be added to the sharing portion is copied, and provision of the annotation for portions other than the sharing portion is requested (step 86). The above described method is used for the annotation provision. As is described above, since an annotation provided in advance can be copied for the sharing portion, and the user need only add the annotation for portions other than the sharing portion. As a result, the workload required for the provision of the annotation can be reduced. When the application of the annotation to the sharing portion is impossible, the provision of the annotation for the entire page is requested (step 85). Thereafter, the same process as in the addition of the annotation is performed for the page group having the temporary layout ID (step 87). And a check is performed to determine whether the above process has been performed for [generally to all] the page groups in the layout sharing groups (step 88). When the page groups have been processed, this processing is terminated (step 89). But when [generally all] the pages have not yet been processed, program control returns to step 81 and the processing is repeated. When the annotation is not applied for the entire sharing layout, the inter-layout distance calculation expression is also corrected (step 87). The processes shown in FIGS. 8 to 10 are performed in order for [generally all] the page groups, and the addition of annotations to the entire site is completed.

As is described above, the information processing system or method of this embodiment can simultaneously add an annotation to or apply it to pages having the same or similar layout. Further, when the same layout is used for one part of the pages, the addition and the application of the annotation to this sharing portion can also be simplified. Thus, the efficiency of the user's operation to add an annotation can be considerably increased. The operating efficiency is especially improved for a site, such as a news site or a database site, whereat the volume of the page files carried is large, and the layouts employed for the pages tend to be used in common.

When the user changes the determination of the similarity that is automatically performed by the system, only the distance calculation expression need be changed in the above described manner, since the system automatically changes the determination reference. Thus, the grouping accuracy can be improved. As the determination reference is changed by the user operation performed to provide an annotation, the user need only provide an annotation for the operating efficiency to be automatically improved. That is, as learning effect, the reference for determining the layout group or the layout sharing group is automatically changed by the user operation that is performed. In this embodiment, an example for the simultaneous provision of an annotation has been explained. However, an annotation that has already been provided can be used for the dynamic provision of an annotation for a page file, and for transcoding, as follows.

Specifically, while a user is browsing an HTML document, an annotation, such as "marking", is provided to a specific position, and the system stores this information with the layout data (layout tags and characteristic values) for a pertinent page. During the browsing performed thereafter, the user employs this layout data to perform transcoding, such as division of a screen or the embedding of a link at a marked position.

Further, when the browsing of a page having no annotation is requested, the inter-page distance calculation module calculates a distance between a requested page and a page for which annotations have already been registered. As a result, when the inter-page distance is smaller than a threshold value, transcoding is performed using the annotation provided for the nearest page, and the results are presented to the user. When the user points at an annotation error, the correction module for the function of distance calculation changes the distance calculation expression. Further, the user can add new annotation information, as needed. With this method, since the user can add an annotation as needed while browsing, instead of adding annotations for all the pages in advance, the annotations can be added to the entire site, step by step.

The invention has been specifically explained for an example embodiment; however, the present invention is not limited to this embodiment, and can be variously changed without departing from the scope of the invention. For example, in the above embodiment, to determine the similarity between the page files, the method has been explained whereby the distance between the pages or between the layout groups is calculated by weighting the layout tags and characteristic values. However, the method is not thereby limited, and a tag skeleton method may be employed, or the similarity of the images or the contents (text) of HTML documents may be employed as a determination reference.

In addition, in this embodiment, the acquisition of the layout sharing group and the application of an annotation to a sharing layout using the layout sharing group need not be requisite conditions for the present invention. In other words, the present invention includes a case that is limited to the acquisition of the layout groups and the application of the annotation to the layout group. In this case, the effects provided by the invention, such as the reduction in the labor required for providing annotations, can be obtained. Furthermore, in this invention, the condition for correcting the calculation expression for the distances between pages or layout groups need not be a requisite condition. In this event, effects otherwise provided by the invention can also be obtained.

In this embodiment, the similarities between the layouts of HTML documents are employed to form groups. However, the present invention can be extended to a determination of the similarities between tags that are not related to the layout, or the similarities of the contents of a document. In this case, the similarities evidenced by HTML document structures or the contents of documents can be determined, and this determination can be employed for an analysis, for example, of a site by a site manager, or for an analysis of a history for the changing a page file at a site. Further, in the example embodiment, an HTML file has been used as a page file. However, the present invention can be applied for a page file written in a markup language, such as XML (Extensible Markup Language) or dynamic HTML.

Thus, this invention includes an operation for providing an annotation for a page file can be efficiently performed. And in addition, using the system of the invention, layout groups or layout sharing groups can be more accurately formed. The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. An information processing method comprising:
providing an annotation for multiple page files, including the steps of:
obtaining a plurality of page files from a web site;
generating a group of said page files, page layout structures of which are at least similar by analyzing said page files to introduce structural descriptive forms for said page layout structures and to assign characteristic values for said structural descriptive forms; employing said structural descriptive forms and said characteristic values to calculate an inter-page distance representing a similarity of said page files; and grouping said page files, of which said inter-page distance is equal to or smaller than a predetermined value;
providing a first annotation for an arbitrary page file in said group; and
correlating said first annotation with at least a part of other page files of said group;
wherein said step of correlating said first annotation with said other page files in said group includes the steps of:
determining whether said first annotation should be applied for the page files of said group;
adding a second annotation, when the determination is false, for an arbitrary page file of a page group consisting of page files with which said first annotation is not correlated;
correlating said second annotation with at least a part of other page files of said page group; and
correcting a calculation expression for said inter-page distance, so that, at said step of generating a group, said page file with which said first annotation is correlated and said page files that are correlated with said second annotation do not fall in the same group.

2. The information processing method according to claim 1, wherein said structural descriptive forms are layout tags employing a style for designating a location on a page for representing tags that are correlated with said page layout structures included in said page files; and wherein said characteristic values are attributes of said layout tags and values of said attributes.

3. The information processing method according to claim 1, wherein said inter-page distance is obtained by calculating a sum of the values obtained by weighting said characteristic value and said structural descriptive form that is included in common with said multiple page files.

4. The information processing method according to claim 1, wherein said inter-page distance is calculated by using the sum of values obtained by weighting said characteristic value and said structural descriptive form that is included in common with said multiple page files; and wherein said calculation expression for said inter-page distance from a group of steps corrected by performing at least one step from a group of steps including:
an operation for increasing said weighting of said structural descriptive form and said characteristic value, for said structural descriptive form and said characteristic value that are different between said page file correlated with said first annotation and said page file correlated with said second annotation, and
an operation for reducing said weighting of said structural descriptive form and said characteristic value, for said structural descriptive form and said characteristic value that are in common with said page file correlated with said first annotation and said page file correlated with said second annotation.

5. An article of manufacture comprising a computer usable medium having computer readable program code means embodied therein for causing annotation, the computer readable program code means in said article of manufacture comprising computer readable program code means for causing a computer to perform the steps of claim 1.

6. A program storage device readable by machine, tangibly embodying a program of instructions executable by the machine to perform method steps for annotation said method steps comprising the steps of claim 1.

7. An information processing method comprising:
providing an annotation for multiple page files, including the steps of:
obtaining a plurality of page files from a web site;
generating a plurality of groups of said page files, wherein page layout structures of each group being at least similar by analyzing said page files to introduce structural descriptive forms for said page layout structures and to assign characteristic values for said structural descriptive forms; employing said structural descriptive forms and said characteristic values to calculate an inter-page distance representing a similarity of said page files; and grouping said page files into said groups, wherein each group has an inter-page distance equal to or smaller than a predetermined value;
providing a first annotation for an arbitrary page file in each said group; and
correlating said first annotation with at least a part of other page files of each said group;
introducing a representative structural descriptive form that represents said each group and a representative characteristic value for said representative structural descriptive form;
employing said representative structural descriptive form and said representative characteristic value to calculate an inter-group distance that delineates the similarity between said groups;
grouping said page files that are included in said groups, said inter-group distance of which is equal to or smaller than a predetermined value, and generating a common group;
adding an added annotation to a common area wherein part of the page layout structure of an arbitrary file, included in common for the members of said common group, is the same as or similar to at least a part of the page layout structure of a different page file; and
correlating said first annotation with said common area provided for said different page file included, in common, for said common group;
wherein said step of correlating said first annotation with said common area provided for said different page file includes the steps of:
determining whether said first annotation should be applied for said common area provided for the page files of said common group;
adding a second annotation, when the determination is false, to the common area of an arbitrary page file of a page group consisting of page files including said common area with which said first annotation is not correlated;

correlating said second annotation with 'Yes' part of the common areas of other page files of said page group; and correcting a calculation expression for said intergroup distance, so that, at said step of generating a common group, said page file including said common area correlated with said first annotation and said page files including said common areas correlated with said second annotation do not fall in the same common group.

8. The information processing method according to claim 7, wherein said representative structural descriptive forms are layout tags employing a style for designating the location on a page for representing tags correlated with said page layout structures of said page files; and wherein said representative characteristic values are attributes of said layout tags and values of said attributes.

9. The information processing method according to claim 7, wherein said inter-group distance is calculated by using the sum of the values obtained by weighting said representative characteristic value and said representative structural descriptive form that is included in common with said multiple groups.

10. An information processing system for providing an annotation for multiple page files, comprising:

means for obtaining page files from a web site;

means for generating a group of said page files, page layout structures of which are the same or similar comprising means for analyzing said page files to introduce structural descriptive forms for said page layout structures and assign characteristic values for said structural descriptive forms; means for employing said structural descriptive forms and said characteristic values to calculate an inter-page distance representing the similarity of said page files; and means for grouping said page files, of which said inter-page distance is equal to or smaller than a predetermined value;

means for providing a first annotation for an arbitrary page file in said group; and means for correlating said first annotation with at least a part of other page files of said group;

wherein said means for correlating said first annotation with said other page files in said group includes:

means for determining whether said first annotation should be applied for the page files of said group;

means for adding a second annotation, when the determination is false, for an arbitrary page file of a page group consisting of page files with which said first annotation is not correlated;

means for correlating said second annotation with at least a part of other page files of said page group; and means for correcting a calculation expression for said inter-page distance, so that, at said step of generating a group, said page file correlated with said first annotation and said page files correlated with said second annotation do not fall in the same group.

11. The information processing system according to claim 10, wherein said structural descriptive forms are layout tags employing a style for designating the location on a page for representing tags correlated with said page layout structures of said page files; and wherein said characteristic values are attributes of said layout tags and values of said attributes.

12. The information processing system according to claim 10, wherein said inter-page distance is calculated by using the sum of the values obtained by weighting said characteristic value and said structural descriptive form that is included in common with said multiple page files.

13. The information processing system according to claim 10, wherein said inter-page distance is calculated by using the sum of values obtained by weighting said characteristic value and said structural descriptive form that is included in common with said multiple page files; and wherein said calculation expression for said inter-page distance is corrected by performing at least one step from a group of steps including:

an operation for increasing said weighting of said structural descriptive form and said characteristic value, for said structural descriptive form and said characteristic value that are different between said page file correlated with said first annotation and said page file correlated with said second annotation, and an operation for reducing said weighting of said structural descriptive form and said characteristic value, for said structural descriptive form and said characteristic value that are in common with said page file correlated with said first annotation and said page file correlated with said second annotation.

14. An information processing system, for providing an annotation for multiple page files, comprising:

means for obtaining page files from a web site;

means for generating a plurality of groups of said page files, page layout structures of each group being the same or similar comprising means for analyzing said page files to introduce structural descriptive forms for said page layout structures and assign characteristic values for said structural descriptive forms; means for employing said structural descriptive forms and said characteristic values to calculate an inter-page distance representing the similarity of said page files; and means for grouping said page files, of which said inter-page distance is equal to or smaller than a predetermined value;

means for providing a first annotation for an arbitrary page file in each said group;

means for correlating said first annotation with at least a part of other page files of each said group;

means for introducing a representative structural descriptive form that represents said groups and a representative characteristic value for said representative structural descriptive form;

means for employing said representative structural descriptive form and said representative characteristic value to calculate an inter-group distance that delineates the similarity between said groups;

means for grouping said page files that are included in said groups, said inter-group distance of which is equal to or smaller than a predetermined value, and generating a common group;

means for adding an added annotation to a common area wherein part of the page layout structure of an arbitrary file, included in common for the members of said common group, is the same as or similar to at least a part of the page layout structure of a different page file; and means for correlating said annotation with said common area provided for said different page file included in common for said common group wherein said means for correlating said first annotation with said common area provided for said different page file includes:
- means for determining whether said first annotation should be applied for said common area provided for the page files of said common group;
- means for adding a second annotation, when the determination is false, to the common area of an arbitrary page file of a page group consisting of page files including said common area with which said first annotation is not correlated;
- means for correlating said second annotation with 'Yes' part of the common areas of other page files of said page group; and
- means for correcting a calculation expression for said inter-group distance, so that, at said means for generating a common group, said page file including said common area correlated with said first annotation and said page files including said common areas correlated with said second annotation do not fall in the same common group.

15. The information processing system according to claim 14, wherein said representative structural descriptive forms are layout tags employing a style for designating the location on a page for representing tags correlated with said page layout structures of said page files; and wherein said representative characteristic values are attributes of said layout tags and values of said attributes.

16. The information processing system according to claim 14, wherein said intergroup distance is calculated by using the sum of the values obtained by weighting said representative characteristic value and said representative structural descriptive form that is included in common with said multiple groups.

* * * * *